United States Patent [19]

Gumb et al.

[11] Patent Number: 5,187,743
[45] Date of Patent: Feb. 16, 1993

[54] TELEPHONE BASE WITH A DISPLAY UNIT

[75] Inventors: Beverley W. Gumb, London; Gerd Kuhfus, Dorchester; James N. Schmidt, London, all of Canada

[73] Assignee: Northern Telecom Limited, Montreal, Canada

[21] Appl. No.: 824,423

[22] Filed: Jan. 23, 1992

[51] Int. Cl.[5] .......................... H04M 3/00; G08B 5/36
[52] U.S. Cl. .................................. 379/436; 379/435; 340/815.14
[58] Field of Search ............... 379/435, 436, 396, 354, 379/428; 340/784, 700, 815.14, 815.15; 248/454, 291, 917, 918, 919, 920, 921, 922, 923

[56] References Cited

U.S. PATENT DOCUMENTS

| | | | |
|---|---|---|---|
| 3,784,135 | 1/1974 | Owen, Jr. | 248/923 |
| 4,421,035 | 12/1983 | Gubbe et al. | 248/455 |
| 4,615,502 | 10/1986 | McLaughlin | 248/923 |
| 4,669,694 | 6/1987 | Malick | 248/923 |
| 4,693,444 | 9/1987 | Williams et al. | 248/923 |
| 4,790,504 | 12/1988 | Wills et al. | 248/291 |

FOREIGN PATENT DOCUMENTS 661396  7/1987  Switzerland ............ 379/436

*Primary Examiner*—James L. Dwyer
*Assistant Examiner*—Jack Chiang
*Attorney, Agent, or Firm*—R. J. Austin

[57] ABSTRACT

A telephone base with a display unit having a housing which is pivoted to the base. To locate the display unit in any desired angular position in simple manner, the housing has a convex outer surface formed on a constant radius centered on the pivotal axis and a plurality of parallel grooves are provided upon the surface and extending axially. The grooves are engageable by a free end of a leaf spring which is mounted directly to the housing.

7 Claims, 3 Drawing Sheets

TELEPHONE BASE WITH A DISPLAY UNIT

This invention relates to telephone bases.

Telephones conventionally comprise telephone bases and handsets which are supported by the bases when the phones are not in use. Some recent telephone designs have incorporated visual display units as parts of the telephone base designs. These display units have been either LED or LCD-type display units and are used to convey information, such as the number of an incoming call. For convenience of the user, a display unit is sometimes pivotally mounted in position so that it may be tilted to any chosen angle for ease of reading by the user and some means is incorporated in the base to hold the unit in the chosen position. While, from the point of view of the user, the pivoting and holding in position of a display unit is functionally acceptable, structures for such a simple mechanical requirement for positional control of display units tend to be unduly complex and have an inordinate number of parts. In one design, the display unit has a convex surface covered with a high friction material and a friction force is applied to the high friction material by a braking device which allows for desired pivoting of the unit and will then retain the unit in a chosen position. In other designs, complex spring holding arrangements and ratchets are mounted upon mounting structures within telephone bases and require a large number of individual parts.

The present invention relates to a telephone base and which seeks to provide for a desired positional change of a display unit while minimizing the number of parts required for this purpose.

Accordingly, the present invention provides a telephone base comprising:

a cover; a display unit pivotally mounted to the cover so as to be movable around a pivotal axis from one desired pivotal position to another, the display unit comprising a housing defining on one side a viewing aperture and on another side having an outer convex surface formed with a series of parallel grooves which extend parallel to the pivotal axis; and leaf spring means having a first part secured directly to the cover and a second part resiliently flexible relative to the first part and resiliently engaged with any one of the grooves corresponding to a desired pivotal position of the display unit.

As may be seen, in the telephone base according to the invention, the spring means is secured directly to the cover of the base and this avoids the use of further securing parts for the spring means and within the cover. In addition to this, the housing of the display unit is itself formed with a series of parallel grooves for engagement by the leaf spring means, and thus the use of additional elements mounted upon the housing and for engagement by the spring means is avoided. Conveniently, the housing is made from a molded plastics material which is integrally formed with the grooves. For convenience in manufacture, the grooves may extend axially from end to end of the other side of the housing or, alternatively, may extend wholly or only partly along the axial length of this other side. The leaf spring means may comprise a single leaf spring which is held by the cover or may comprise two or more leaf springs which are spaced apart axially of the housing.

Conveniently, the cover comprises upper and lower cover parts and the spring means is preferably secured between these upper and lower parts. In a particular structure, the lower part comprises upwardly extending boss means and the upper part has a wall facing downwardly towards the lower part and extending over the boss means. The first part of the spring means is secured upon the boss means and is sandwiched between the boss means and the wall.

One embodiment of the invention will now be described, with reference to the accompanying drawings, in which.

Figure 3:
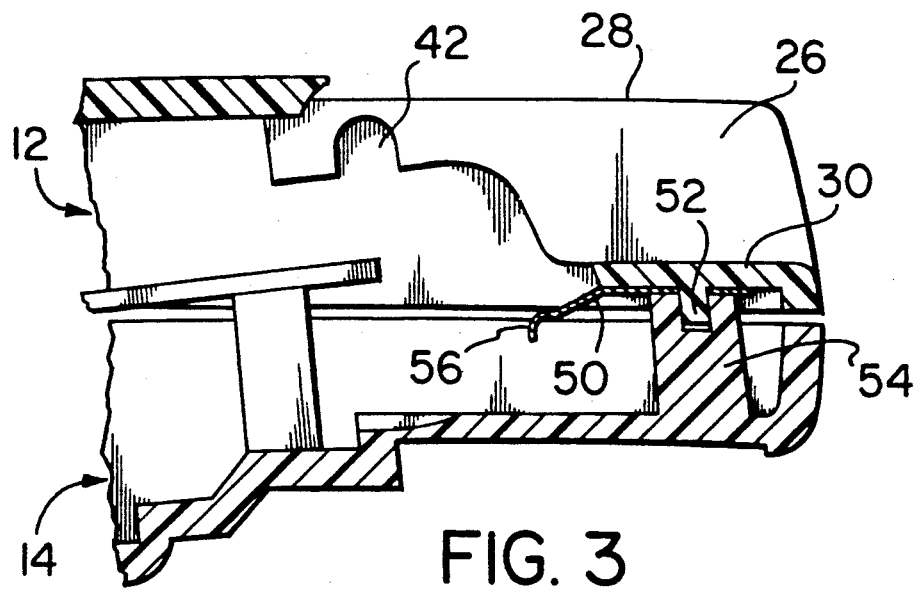
FIG. 3 is an enlarged cross-sectional view through part of the assembled cover taken along line III—III in FIG. 2.
Figure 4:
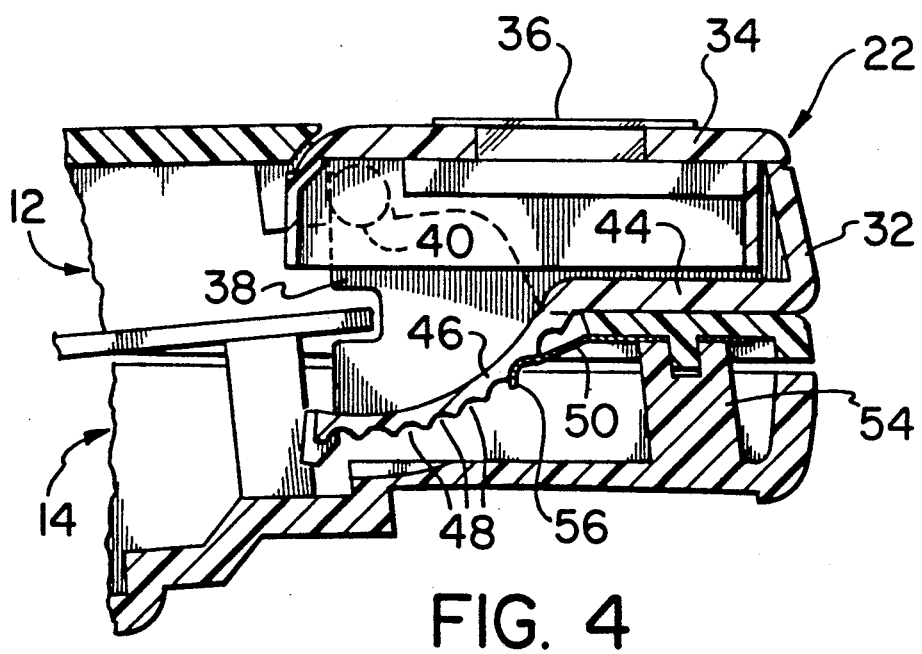
Figure 5:
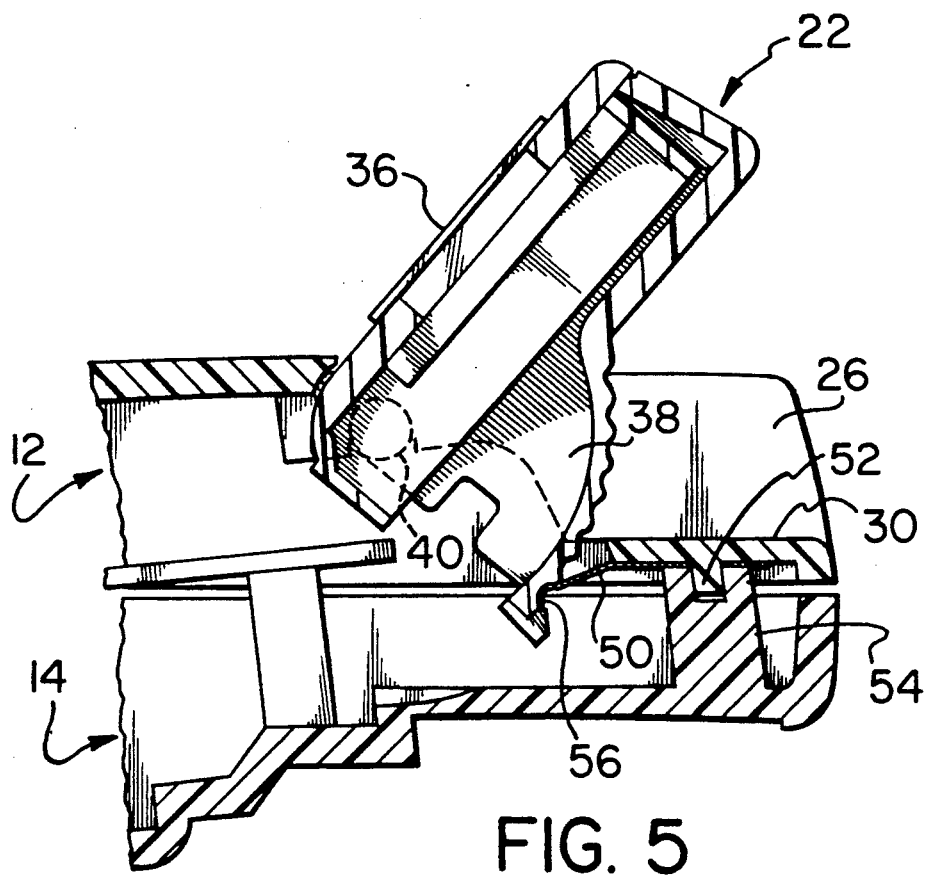
Figure 6:
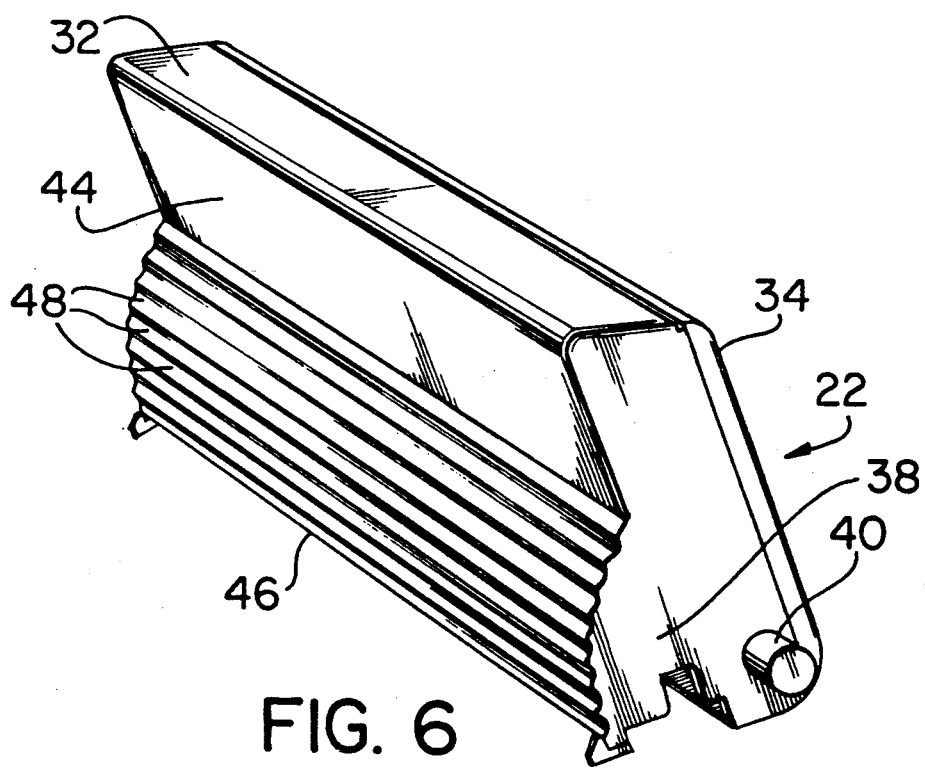

FIGS. 4 and 5 are views similar to FIG. 3, with the addition of a display unit into the cover, and showing the display unit in two different pivotal positions; and FIG. 6 is an isometric view, to smaller scale than FIGS. 3, 4 and 5, on the underside of the display unit and taken from the opposite direction from the views shown in FIGS. 3, 4 and 5.

Figure 1:
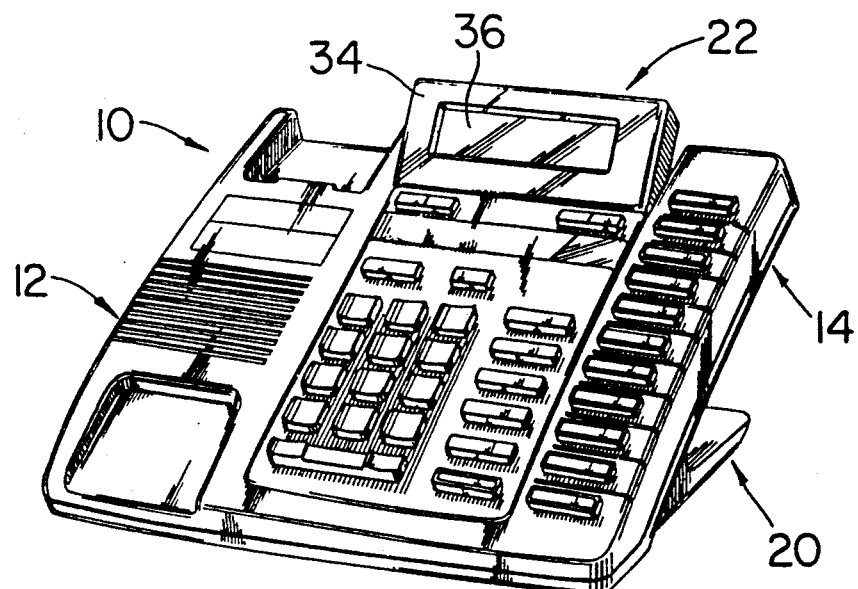
FIG. 1 is an isometric view of a telephone base according to the embodiment.
Figure 2:
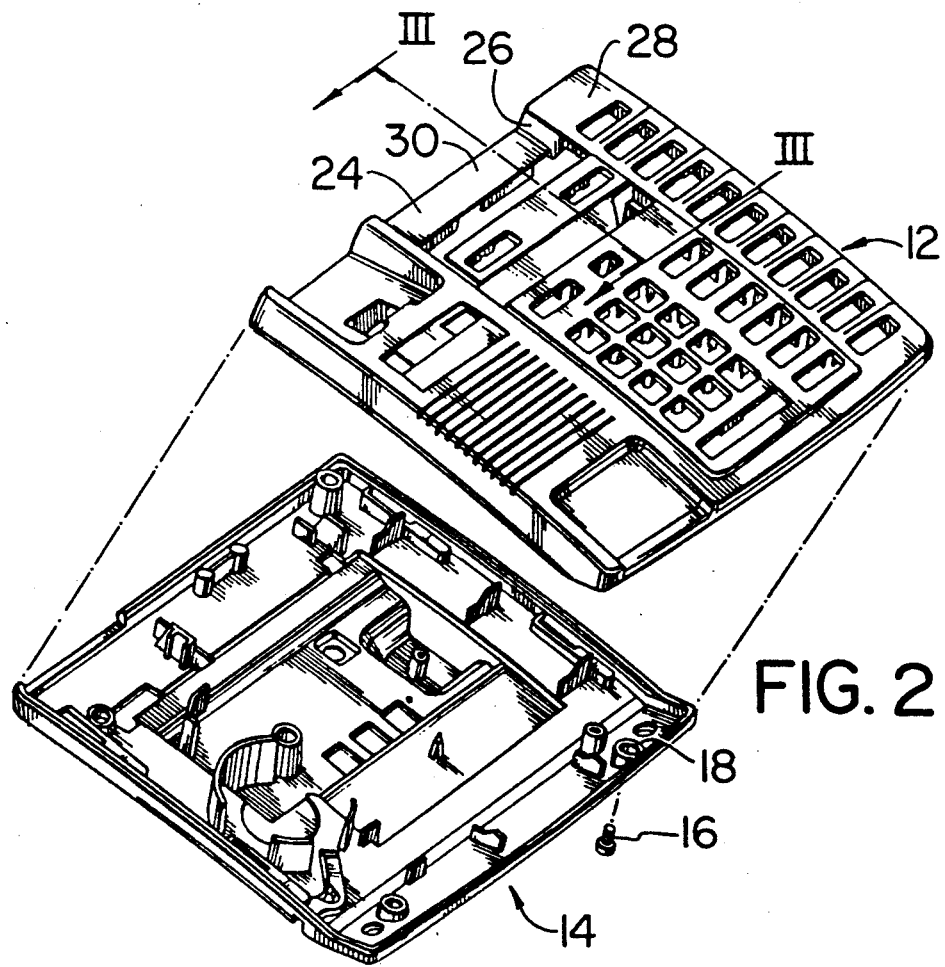
FIG. 2 is an exploded isometric view of a cover for the telephone base and taken from a different position to that of FIG. 1.

In the embodiment, as shown in FIGS. 1 and 2, a telephone base 10 comprises upper and lower cover parts 12 and 14 which are assembled together by the reception of screws 16 (FIG. 2) through bosses 18 in the lower part 14, and received into corresponding bosses (not shown) in the upper cover part 12. The assembly of the cover parts is secured onto a base support 20 which holds the cover assembly in an inclined position, as shown in FIG. 1, when carried upon a horizontal surface.

The telephone base is provided with a display unit 22. The upper edge region of the upper cover part 12 is formed with a recess 24 for accommodating the display unit, this recess defined by two short side walls 26 depending from a top wall 28 of the part 12 of the cover and an elongate wall 30 extending between the side walls 26. The cover part 12 is integrally molded with the side walls and the elongate wall 30.

As shown by FIGS. 4, 5 and 6, the display unit 22 comprises a housing formed by a lower housing part 32 and an upper housing part 34, the housing parts assembled together and containing all of the features necessary for operation of the display unit. The upper part 34 of the display unit provides a side of the housing formed with a viewing aperture 36 (FIG. 1). The lower part 32 of the display unit has two side walls 38, each of which is formed with a pivot pin 40, the pivot pins being axially aligned and received in the complete assembly of the base upwardly into downwardly opening pin receiving slots 42 (FIG. 3) of the short side walls 26 of the cover part 12. In the lowest pivotal position of the display unit 22 (FIG. 4), an underwall 44 of the lower part 32 of the housing is supported upon the elongate wall 30 and the display unit substantially follows the contours of the outer surface of the cover of the telephone base. Upon pivoting upwardly, however, the display unit projects beyond the surface of the telephone base cover, as shown by FIGS. 1 and 5, the tilting operation being performed to direct the viewing aperture 36 forwardly at a desired pivotal position for ease of reading by the user.

The display unit may be pivoted to any of a plurality of chosen pivotal positions and the mechanism for providing this function is extremely simple, as will now be described.

As may be seen clearly from FIG. 6, the underwall 44 is integrally formed at one side with an arcuate wall extension 46 which has an outer convex surface generated at a constant radius centered on the axis of the pivot pins 40. The outer convex surface is formed with a series (namely eight) of parallel grooves 48 which extend parallel to the pivotal axis of the pins 40, axially from end to end of the wall extension 46. Conveniently, as the housing parts 32 and 34 are made from molded plastics material, then the grooves 48 are integrally molded in the lower housing part.

A leaf spring means is incorporated into the telephone base so as to coact with the grooves 48 to retain the display unit in any desired pivotal position. As shown particularly by FIGS. 3, 4 and 5, in this embodiment the leaf spring means comprises a single leaf spring 50 secured by inserting two plastic posts 52 (one being shown) through two holes in one end portion of the spring 50, the posts integrally molded with the wall 30 and extending into two bosses 54 which lie within the lower part 14 of the cover of the base and extend upwardly towards the elongate wall 30. The one end portion of the spring 50 is thus sandwiched between the tops of the bosses 54 and the elongate wall 30 as shown in FIGS. 3, 4 and 5. The spring 50 is a cantilever spring having an arcuate free end 56 which conforms closely to concavely shaped surfaces of the grooves 48, as shown by FIGS. 4 and 5, so that the free end intimately engages the surface of the any groove 48 into which it is located.

As may be seen from the above description, the construction for maintaining the display unit 22 in any desired pivotal position is extremely simple. The housing of the display unit is itself formed with the grooves 48 for location purposes and the holding of the unit in any location is provided by the resilient arcuate end 56 of the spring 50. This resilient end 56 is resiliently held in any groove 48 which is brought into alignment with the end 56 during pivoting of the display unit. In its lowest position, the display unit is shown in FIG. 4 with the end 56 of the spring 50 engaged with a groove 48 towards the one side of the series of grooves. The display unit may be pivoted upwardly from the position shown in FIG. 4, and in an anti-clockwise direction into any desired pivotal position in which the spring 56 fits snugly into a corresponding one of the grooves 48 until in the limiting upward position shown in FIG. 5, the end 56 of the spring is fitted into the groove 48 in the series. During the movement of the unit between one pivotal position and another, the spring is, of course, resiliently flexed out of a groove by passing over a rib between grooves, thereby enabling a ratcheting type action to take place until the spring is nested into the groove 48 which corresponds to the desired pivotal position of the display unit.

Apart from the simplicity in the structure shown in the embodiment, the display unit is easily assembled into the cover of the telephone base. As may be seen from the above description, the spring is mounted on to the lower part 14 of the cover before the top part 12 of the cover is added to it. This enables the display unit to be assembled into the top part 12 of the cover by location of the pivot pins 40 into the recesses 42 and the cover parts may then be brought together, during which the display unit is moved towards the spring 50 which becomes nested comfortably within one of the grooves 48 as the cover parts 12 and 14 are screwed together.

What is claimed is:

1. A telephone base comprising:
   a cover;
   a display unit pivotally mounted to the cover so as to be movable around a pivotal axis from one desired pivotal position to another, the display unit comprising a housing having a first side defining a viewing aperture and a second side having an outer convex surface formed with a series of parallel grooves which extend parallel to the pivotal axis; and
   leaf spring means having a planar first part and a second part resiliently flexible relative to the first part;
   and the cover comprising upper and lower cover parts which provide opposing planar surfaces, the planar first part of the leaf spring means sandwiched and held between the planar surfaces, the second part of the spring means extending from the planar surfaces and engaged with any one of the grooves corresponding to a desired pivotal position of the display unit, the grooves and the second part of the spring means shaped to permit pivotal movement of the display unit in either pivotal direction against the force of the spring means.

2. A telephone base according to claim 1 wherein the second side of the housing is made from molded plastic integrally formed with the grooves.

3. A telephone base according to claim 2 wherein the grooves extend axially from end to end of the second side of the housing.

4. A telephone base according to claim 2 wherein the grooves extend only partially along the axial length of the second sides of the housing.

5. A telephone base according to claim 2 wherein the leaf spring means comprises two leaf springs spaced apart axially on the cover.

6. A telephone base according to either claim 2 or claim 3 wherein the leaf spring means comprises a single leaf spring.

7. A telephone base according to claim 1 wherein the lower cover part comprises an upwardly extending boss disposed within the lower part, the boss providing one of the planar surfaces at its free end and a bore extending inwardly from its free end, the upper part of the cover comprises a wall providing the other planar surface which faces downwardly towards the lower cover part and extends over the boss, the first part of the spring means is formed with an aperture and is carried upon the free end of the boss with the aperture aligned with the bore, and the wall of the upper part of the cover has a holding post extending downwardly from said other planar surface, through the aperture and into the bore to secure the first part of the spring means between the wall and the boss.

* * * * *